Dec. 8, 1964   L. A. MOORE   3,160,284
WEIGHT STABILIZING LOAD HANDLING MACHINE
Filed Feb. 1, 1963   5 Sheets-Sheet 1

INVENTOR.
LAWRANCE A. MOORE
BY

Dec. 8, 1964 L. A. MOORE 3,160,284
WEIGHT STABILIZING LOAD HANDLING MACHINE
Filed Feb. 1, 1963 5 Sheets-Sheet 2

INVENTOR.
LAWRANCE A. MOORE
BY

Dec. 8, 1964 L. A. MOORE 3,160,284
WEIGHT STABILIZING LOAD HANDLING MACHINE
Filed Feb. 1, 1963 5 Sheets-Sheet 3

INVENTOR.
LAWRANCE A. MOORE
BY

Dec. 8, 1964 L. A. MOORE 3,160,284
WEIGHT STABILIZING LOAD HANDLING MACHINE
Filed Feb. 1, 1963 5 Sheets-Sheet 4

INVENTOR.
LAWRANCE A. MOORE
BY
Henry Powers

Dec. 8, 1964   L. A. MOORE   3,160,284
WEIGHT STABILIZING LOAD HANDLING MACHINE
Filed Feb. 1, 1963   5 Sheets-Sheet 5

INVENTOR.
LAWRANCE A. MOORE
BY Henry Powers

United States Patent Office 3,160,284
Patented Dec. 8, 1964

3,160,284
WEIGHT STABILIZING LOAD HANDLING MACHINE
Lawrence A. Moore, Beloit, Wis., assignor to Beloit Corporation, a corporation of Wisconsin
Filed Feb. 1, 1963, Ser. No. 255,204
6 Claims. (Cl. 212—49)

This invention relates to mobile land vehicles and more particularly to land vehicles having a boom assembly mounted thereon.

Heretofore, the operability of conventional cranes, derricks and other land vehicles having boom assemblies mounted thereon was limited by the inclination of the ground during specific operations while the vehicle is stationary, and during movement of the vehicle over changing terrain of the ground over which the vehicle travels. Such curtailment in the operability of these conventional units was marked when such vehicle is inclined in various positions on sloping ground, such as hills and the like. As is well known, such inclination of the vehicle shifts the center of gravity away from the point of maximum load stability of the vehicle on the ground which unbalances the vehicle tending it to overturn if some correction is not made, as for example by movement of the vehicle itself, to reduce the critical deviation of the center of gravity from this maximum load stability point. Also, as will be appreciated, shifting of the center of gravity from the maximum load stability point likewise occurs during travel of the vehicle over uneven terrain having marked differences in grade, thus requiring the operator to shift the boom assembly to prevent its overturning.

Accordingly it is an object of this invention to eliminate disadvantages of the prior art.

It is another object of this invention to provide novel means for maintaining the center of gravity of land vehicles, having boom assemblies mounted thereon, substantially over the vehicle's point of maximum load stability.

It is another object of this invention to provide an improved and novel land vehicle having boom assemblies mounted thereon adapted to maintain the vehicle's center of gravity substantially near or over the vehicle's point of maximum load stability.

Other objects of this invention will become more apparent from the following description and drawings in which.

Figure 1:
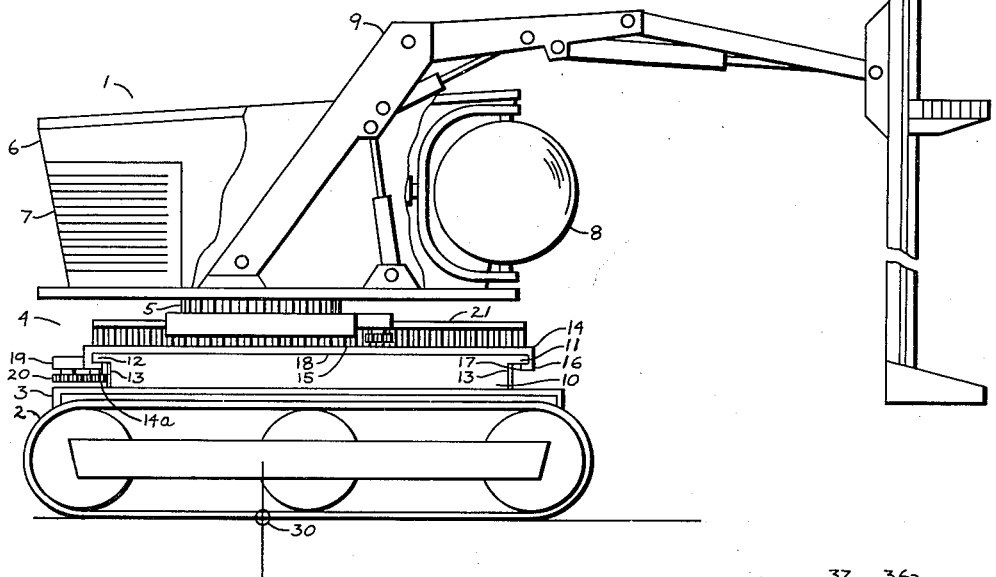
FIGURE 1 is an elevational view illustrating one embodiment of this invention.
Figure 2:
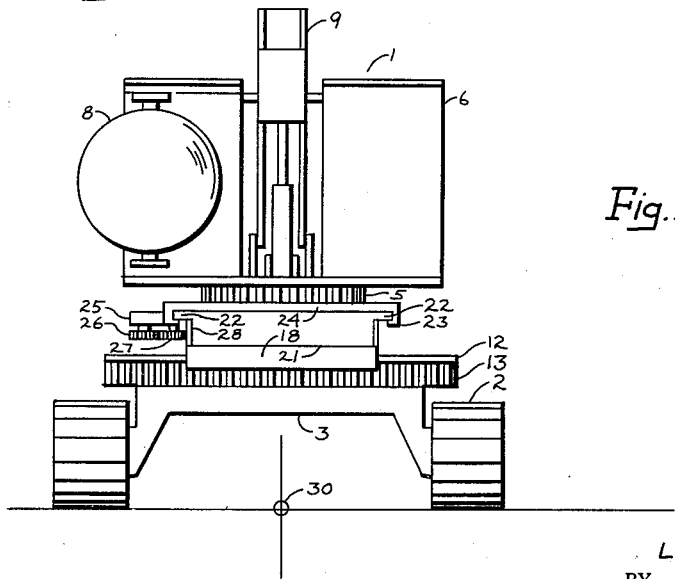
FIGURE 2 is a front view of the embodiment illustrated in FIGURE 1.

Referring to the drawings, FIGURE 1 illustrates one form of the mobile land vehicle having a boom assembly mounted thereon, with the specific structure illustrated therein adapted for use with the de-limbing and felling apparatus disclosed in U.S. application Serial No. 196,195 filed by Robert W. Larson. However it is to be understood that the present invention is applicable to other various types and makes of machines or cranes either of the power-shovel type or those utilized for lifting logs by means of a boom assembly that extends upwardly and outwardly from a turntable form of support, and which is adapted to be raised or lowered to various positions.

As shown in the drawings the vehicle 1 comprises a rotatable driving means such as endless crawler tracks or caterpillar treads 2 for propelling the vehicle over the ground. Mounted to the tracks 2 by suitable and conventional suspension is a base platform or understructure 3 having mounted thereon the weight control structure 4 which supports a base plate or turntable 5 which in turn rotatably mounts a swing-house assembly or super structure 6 which, as is conventional, includes an engine 7, a bubble cab 8 with an extended transparent area, and a boom assembly 9, actuated by operating mechanisms and various other controls located in cab 8 and other portions of the swing-house.

Interposed between the turntable 5 and the base platform 3 is a weight control means 4 for maintaining the center of gravity of the swing-house assembly substantially near or over the maximum load stability point of the vehicle on the ground; and this comprises a track 10 provided with a forwardly extending flanged rail 11 and a rearwardly extending flanged rail 12 each provided below thereof with a rack 13 adapted for engagement with a pinion 14a rotatably mounted on a section of slide 14 of a slide-track unit 18. The slide 14 comprises a base plate 15 with downwardly depending flanges 16 provided with an inwardly extending lip 17 for slanting engagement about and with the flanged rails 11 and 12 of the first track 10. Relative movement of the slide-track unit 18 on track 10 laterally to both sides of the vehicle, is accomplished by means of a motor 19 secured in a suitable position on the slide 14 to drive it in relative movement by means of a drive gear 20 in engagement with the pinion 14a, rotational drive of which causes the desired movement by its meshing with the rack 13. As will be appreciated this desired lateral movement to both sides of the vehicle can be accomplished either manually by the operator in the cab by actuation of motor 19 in the desired direction, or by sensing units, such as weight suspensions and gyros, which sense the inclination of the vehicle on changing terrain.

The slide-track unit comprises a rail base plate 21 having laterally projecting flanges 22 extending in the direction substantially normal to the direction in which the flanged rails 11 and 12 extend. Engaging the laterally projecting flanged rails 22 are inwardly extending lipped flanges 23 of a slide 24 on which is mounted the turntable 5. Forward and rearward movement of the swing-house assembly is accomplished by means of a motor 25 having a driving gear 26 engaging a pinion 27 which is in meshed relationship with a rack 28 provided or formed on the sides of the rail base plate 21.

Figure 3:
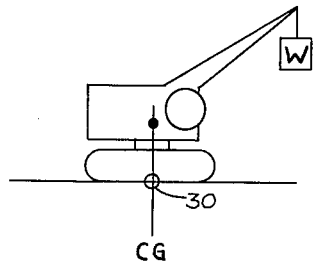
FIGURES 3 through 8 are schematic illustrations of the adaptability of the embodiment of the preceding figures to varying grades in terrain.
Figure 3A:
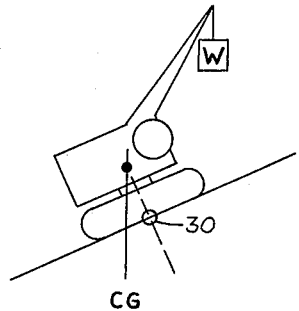
Figure 4:
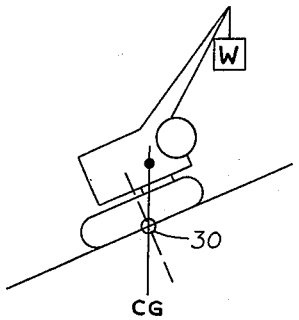
Figure 5:
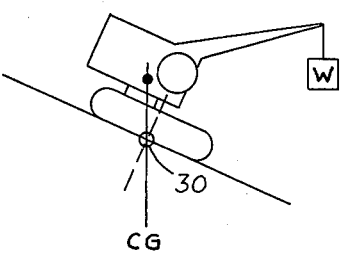

As will be understood, forward and rearward movement of the swing-house assembly is effected by the actuation of the motor 25 either manually by the operator or by suitable conventional servo equipment responsive to inclination of the vehicle by mechanical or gyroscopic sensing devices. As will be appreciated when the vehicle is inclined either rearwardly or forwardly the motor 25 is actuated to move the swing-house assembly in the direction so as to maintain the center of gravity of the swing-house assembly, substantially near or over the point of maximum load stability 30 as illustrated diagrammatically in FIGURES 3 to 5. As shown in FIGURE 3 when the vehicle is on level ground the center of gravity will normally be disposed, by conventional design, substantially over the point of maximum load stability 30. In the absence of any change of relative position of the swing-house assembly on the base structure of the vehicle upon inclination of the vehicle, as for example on a slope such as shown in FIGURE 3a, wherein the center of gravity will deviate away from the point of maximum stability 30, as illustrated by the vertical line through the center of gravity so as to unbalance the vehicle with corresponding tendency to overturn. However, in accordance with this invention, when the vehicle is disposed uphill, the weight control means of this invention effects movement of the swing-house assembly forward on the base structure so as to bring a vertical line which extends downwardly through the center of gravity, of the swing-house assembly, to a position in which it will extend through the point of maximum load stability 30 as a result of bringing the center of gravity of the swing-house assembly substantially above the point of maximum load stability. Similarly when a vehicle is disposed on a downward slope such as in FIGURE 5, the weight control means of this invention effects movement of the swing-house assembly rearwardly on the base structure so as to dispose the center of gravity, of the swing-house assembly, substantially over the point of maximum load stability 30 so that a vertical line will extend through this point and through the center of gravity of the swing-house.

Figure 6:
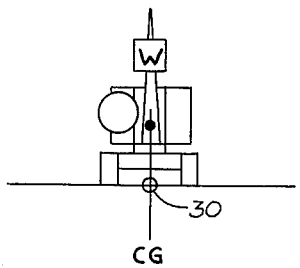
Figure 6A:
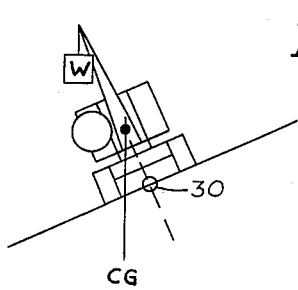
Figure 7:
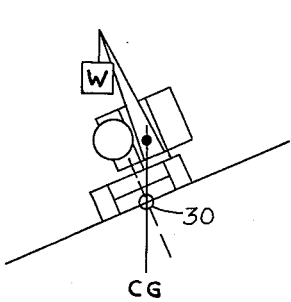
Figure 8:
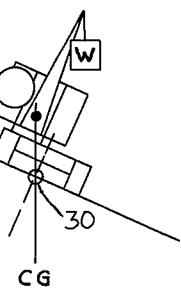

Similarly, as shown in the front view of FIGURE 6, when the vehicle is disposed on level ground the center of gravity of the swing-house assembly will normally be over the point of maximum load stability 30. However in contrast when the vehicle is inclined sideways on a slope, as shown in FIGURE 6a, without any modification of the relative position of the swing-house assembly to the base structure of the vehicle, the center of gravity of the swing-house assembly will deviate from the point of maximum load stability 30 creating the corresponding tendency for overturning of the vehicle. However, with the weight control means of this invention, this tendency of the vehicle to topple on an incline is overcome by sideways movement of the swing-house assembly laterally upwardly so as to bring the center of gravity substantially over the point of maximum load stability 30 so that a vertical line will extend through this point and through the center of gravity of the swing-house assembly. As shown in FIGURE 8, a similar result is obtained when the vehicle is inclined laterally in a direction substantially opposite that shown in FIGURE 7.

Figure 19:
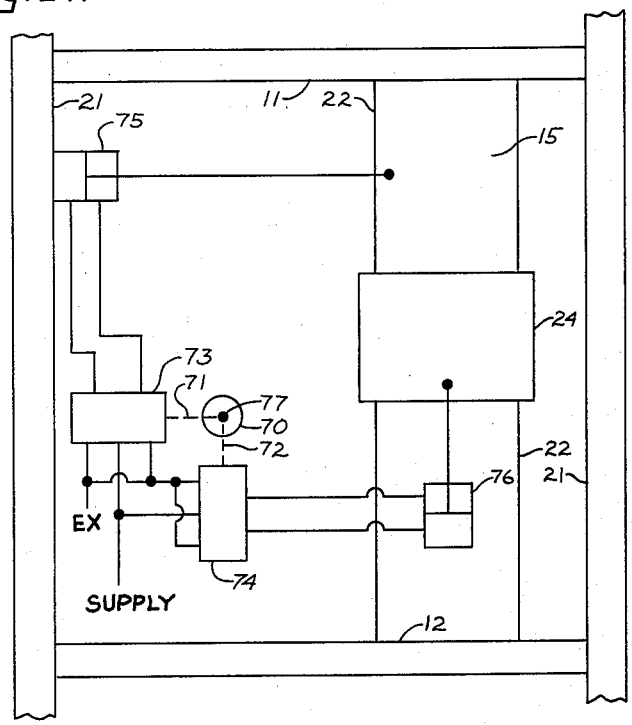
FIGURES 19 to 21 are diagrammatic illustrations of a means for providing automatic operation of the above embodiments.
Figure 20:
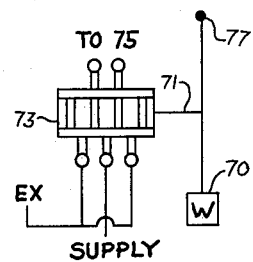
Figure 21:
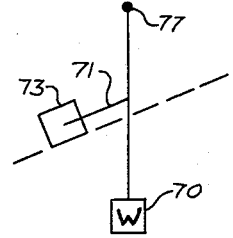

FIGURES 19 to 21 illustrate the sensing devices for actuation of the relative position of the swing-house platform with respect to the base structure. This sensing device comprises a suspended weight 70 mechanically linked by linkages 71 and 72 to respective control valves 73 and 74 which control the flow of hydraulic fluids from a suitable supply and means for exhausting, to hydraulic cylinders 75 and 76 having reciprocating rams which move, respectively, the slide 15 on rail tracks 11, and the slide 24 on the rail tracks 22 (of the slide 15). FIGURES 20 and 21 illustrate the conventional operation of such a sensing device. FIGURE 20 illustrates the relative positions of control valve 73 and the suspended weight 70 when the vehicle is on level ground. In contrast FIGURE 21 represents the relative position of the suspended weight 70 from its pivot point, to the control valve 73 when it is inclined by means of its fixed position to the vehicle positioned on a slope. As will be appreciated, regardless of the inclination of the vehicle the weight 70 will continue to be maintained immediately below its pivot point 77 thus urging its mechanical linkage 71 to provide a corresponding actuation of the hydraulic control valve 73, to thus direct the flow of hydraulic fluid to the hydraulic cylinders 75 to position the slide 15 to its desired disposition so as to provide for placement of the center of gravity, of the swing-house assembly, over the point of maximum load stability. It is to be understood that, although not shown, a similar relationship exists between weight 70, hydraulic control valve 74 and the hydraulic cylinders 76.

Figure 9:
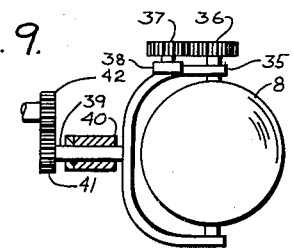
FIGURES 9 and 10 are respectively plan and elevational views of means for further modifying the embodiment of the preceding figures.
Figure 10:
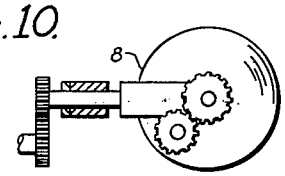
Figure 22:
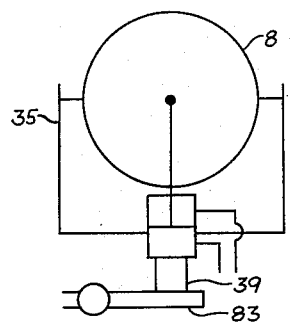
FIGURES 22 to 24 are diagrammatic illustrations of a means for providing automatic operation for maintaining a constant keel or attitude of the cab portion of the above embodiments.
Figure 23:
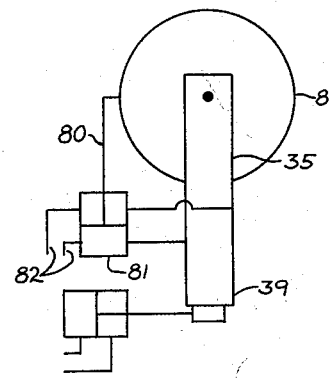
Figure 24:
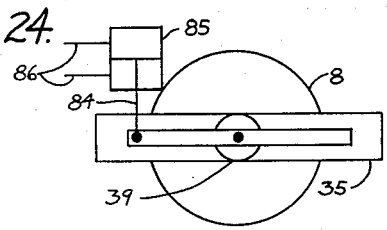

FIGURES 9 and 10 illustrate additional means for maintaining the cab on a constant even keel regardless of the forward or lateral inclination of the vehicle. As illustrated in FIGURE 9 the cab 8 is pivotally mounted in the trunnion 35 permitting the cab to be swiveled with the relative position therein controlled by means of gears 36 and 37 powered by a motor 38 which is actuated by suitable servo mechanism in response to conventional mechanical or gyroscopic devices which sense any deviation from a constant even keel desired for the cab. The maintenance of the constant even keel for the cab in a direction normal to that of the cab within the trunnion 35 is accomplished by means of a depending shaft 39 projecting rearwardly from trunnion 35 and mounted within a journal 40 suitably supported in mounted relationship to the structural framework of the swing-house assembly. Rotation of the shaft 39, with attendant rotation of trunnion 35 is accomplished by means of a gear 41 mounted on shaft 39, and meshing with a driving gear 42 suitably driven by motor, not shown, in response to the same or similar sensing mechanism such as provided for rotation of the cab 8 within trunnion 35. FIGURES 22 and 23 and 24 illustrate a hydraulic means for maintaining a constant even keel in the cab 8. As shown therein the cab 8 is adapted to be rotated about its pivot point within trunnion 35 by means of an extensible ram or rod 80 actuated by means of a hydraulic cylinder 81 movable in response to the flow of hydraulic fluid thereto by means of conduits 82 connected to a suitable hydraulic control valve which is responsive to a sensing device similar to that illustrated in FIGURES 19 to 21. Rotation of the cab 8 through shaft 39 mounted within a journal 40 is obtained by means of a suitable lever 83 moved by means of an extensible and retractable rod 84 actuated from a hydraulic cylinder 85 in response to the flow of hydraulic fluid through conduits 86 connected to another hydraulic control valve likewise responsive to the sensing means utilized in the pivoting of the cab 8 within trunnion 35.

As can be seen the weight control means of this invention, by use of the straight track of this embodiment, enables the boom to be maintained at the same height relative to the ground as it swings around without any need of adjustment therefor since the pivot axis of the boom structure will always be perpendicular to the ground. In addition the ability of the weight control means of this invention to shift the position of the swing-house assembly on the base structure of the vehicle permits more access to the elements of each for maintenance, service and replacement of any parts thereof. Also in addition to more rigidly positioning heavy loads and weights from the boom structure, the operator in this embodiment will also be maintained at constant height from the ground.

Figure 11:
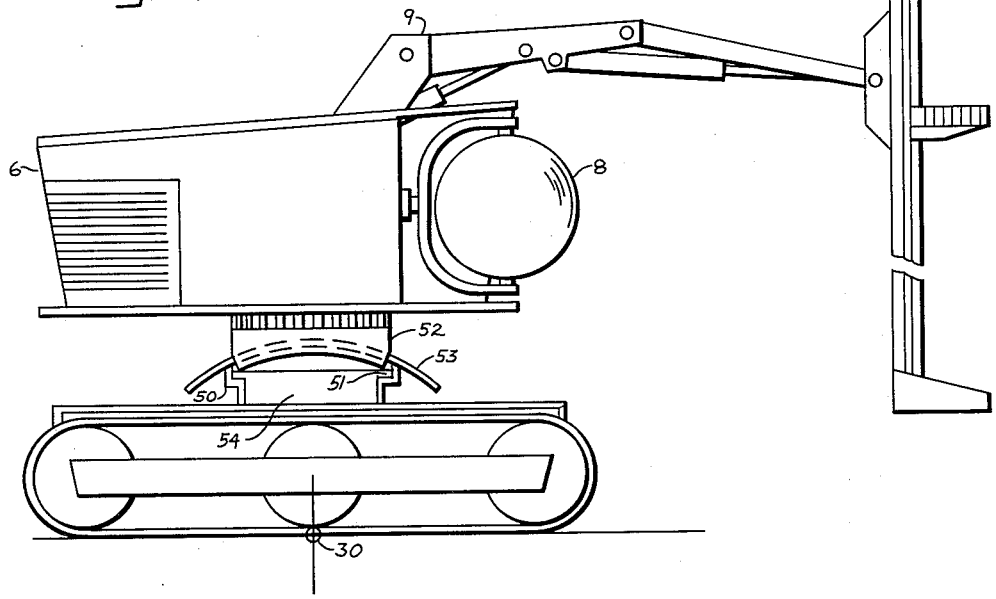
FIGURE 11 is an elevational view illustrating another embodiment of this invention.
Figure 12:
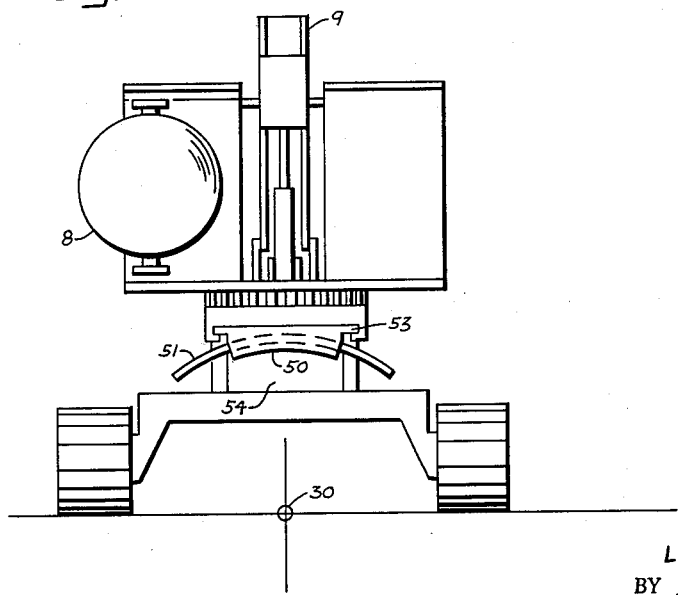
FIGURE 12 is a front view of the embodiment illustrated in FIGURE 11.

FIGURES 11 and 12 illustrate a still further modification of this invention, in which arcuately arched tracks are employed for effecting lateral and forward and rearward relative movement of the swing-house assembly relative to the base structure of the vehicle. As shown in FIGURE 12, the lateral movement of the swing-house assembly 6 is accomplished by means of a slide 50 movable on arcuately arched tracks 51 which rearwardly and forwardly of a track base 54, with the movement thereof obtained by means of a rack similar to that described in conjunction with the preceding embodiment, but not shown herein. Forward and rearward movement is accomplished by means of a slide 52 engaging a track 53 mounted to the previously referred slide 50 which moves along the tracks 51.

The actuation of slide 52 along tracks 53 can be accomplished by a pinion and rack arrangement such as described previously.

Figure 13:
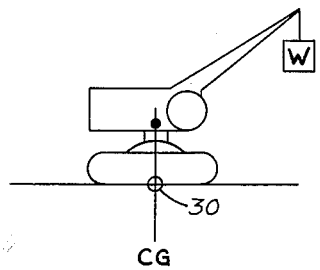
FIGURES 13 through 18 illustrate the adaptability of the last said embodiment to grades of changing terrain.
Figure 13A:
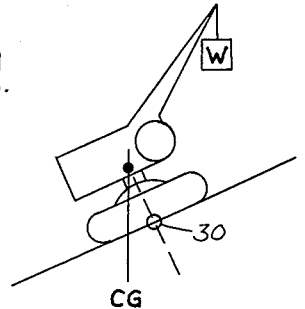

The maintenance of the center of gravity of the swing-house assembly over the point of maximum load stability 30 is illustrated in FIGURES 13 to 18. As shown in FIGURE 13 when the vehicle is disposed on level ground, the center of gravity of the swing-house assembly will be substantially over the point of maximum load stability 30 so that a vertical line will extend through both. However when the vehicle is disposed on an incline such as shown in FIGURE 13a the center of gravity will deviate from its position so as to be spaced away from the point of maximum load stability 30 in the absence of any change of the position of the swing-house assembly relative to the base structure as presently incurred in conventional boom carrying vehicles. In contrast, the weight control means of this invention effects movement of the swing-house assembly by means of slide 52 on track 53 to return the center of gravity of the swing-house assembly substantially over the point of maximum load stability 30 so that a vertical line will extend through both points. Similarly when the vehicle is inclined in opposite direction, the weight control means of this invention effects rearward movement of the swing-house assembly by means of the slide 52 on the arcuate tracks 53 so as to again return and maintain the center of gravity substantially over the point of maximum load stability 30.

Figure 16:
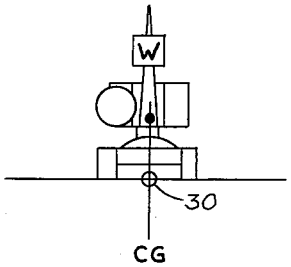
Figure 16A:
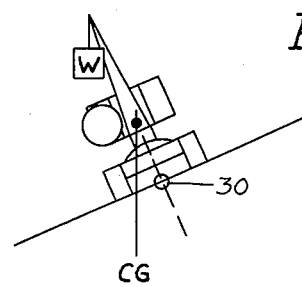
Figure 14:
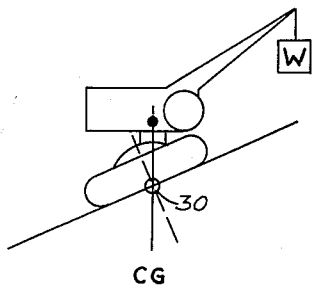
Figure 17:
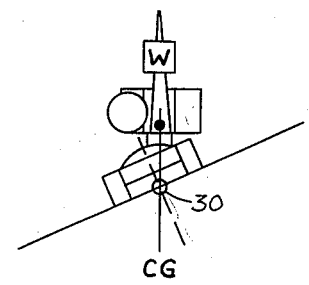
Figure 15:
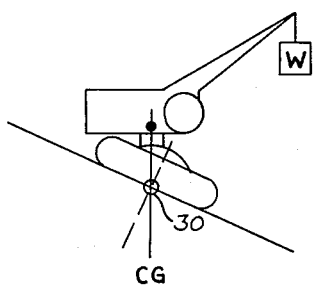
Figure 18:
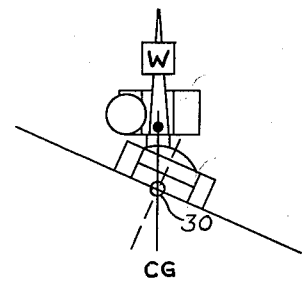

As will be appreciated similar correction is effected upon inclination of the vehicle base structure laterally on inclined terrain. FIGURE 16 illustrates the disposition of the center of gravity of the swing-house assembly over the point of maximum load stability 30 when the vehicle is disposed on level ground. FIGURE 16a illustrates the deviation of the center of gravity, of the swing-house assembly, from the point of maximum load stability 30 in the absence of controlling the relative position of the swing-house assembly to the vehicle base structure by the weight control means of this invention when the base structure of the vehicle is inclined laterally on hills and the like. In contrast FIGURE 17 illustrates the resultant maintenance of the center of gravity, of the swing-house assembly, over the point of maximum load stability by use of the weight control means of this invention. A similar result is illustrated in FIGURE 18 when the opposite inclination of the vehicle base structure is reached relative to the inclination shown in FIGURE 17.

Although the preceding embodiments have been described for maintaining the center of gravity, of the swing-house assembly, substantially near or over the point of maximum load stability 30, it is also to be understood that the position of the center of gravity of the swing-house assembly can be modified so as to over-correct the placement of the center of gravity relative to the point of maximum load stability. For example referring either to the diagrammatically illustrated functions in either FIGURES 3 to 5 or in FIGURES 13 to 18, the position of the center of gravity relative to the point of maximum load stability can be brought so as to place it uphill of the point of maximum load stability. As will be appreciated such over-correction further reduces the tendency of the vehicle to overturn downhill. It is also to be understood that the sensing devices may be employed to continuously maintain the center of gravity of the swing-house assembly substantially near or over the point of maximum load stability regardless of tendencies of the center of gravity to shift when increased load is applied to the end of the boom structure, as for example during lifting of loads and the like.

Although the invention has been described with reference to specific materials, embodiments and details, various modifications and changes, within the scope of this invention, will be apparent to one skilled in the art and are contemplated to be embraced within the invention.

What is claimed is:

1. A mobile land vehicle comprising a base platform; a swing-house assembly mounted on said platform for rotation about an axis generally normal to said platform, said assembly including a cab, engine and a boom assembly; rotatable driving means for propelling said vehicle over the ground; and weight control means for causing movement of said swing-house assembly relative to said platform to maintain automatically the center of gravity of said swing-house assembly substantially over the maximum load stability point of said vehicle on said ground on inclination of said vehicle relative to the grade of said ground.

2. A mobile land vehicle comprising a base platform; a swing-house assembly rotatably mounted on said platform with said assembly including a cab, engine and a boom assembly; rotatable driving means for propelling said vehicle over the ground; and weight control means for maintaining the center of gravity of said swing-house assembly substantially over the maximum load stability point of said vehicle on said ground on inclination of said vehicle relative to the grade of said ground, said weight control means including a first track means adapting said swing-house assembly for reciprocating movement forward and rearward relative to said platform, a first drive means for selectively actuating said swing-house assembly in forward and rearward reciprocating movement on said first track means, a second track means cooperatively connected to said first track means and adapting said swing-house assembly for reciprocating lateral movement to both sides of said vehicle relative to said platform, and a second drive means for selectively actuating said swing-house assembly in said lateral movement on said second track means.

3. The vehicle of claim 2 wherein said first and said second track means are substantially rectilinear and in substantially parallel relationship with each other with said second track means disposed in a direction substantially normal to said first track means.

4. The vehicle of claim 2 wherein said first and said second track means are accurately arched above said platform with said second track means disposed substantially normal to said first track means.

5. The vehicle of claim 4, wherein the arcs of said first and said second track means are generated on a radius having substantially a length extending to at least the maximum load stability point of said vehicle on said ground.

6. A mobile land vehicle comprising a mobile base platform; a swing-house assembly mounted on said platform for rotation about an axis generally normal to said platform, said assembly including a cab, engine and a boom assembly; first hydraulic actuating means for moving said swing-house assembly forwardly and rearwardly on said platform; second hydraulic actuating means for moving said swing-house assembly laterally to either side on said platform; a weight member disposed for movement forwardly, rearwardly and laterally in response to inclined positions of the vehicle; first control valve means operated by said weight member for supplying fluid under pressure to said first hydraulic actuating means to cause movement of said swing-house assembly forwardly when the forward end of the vehicle is inclined upwardly and rearwardly when the rear end of the vehicle is inclined upwardly; and second control valve means operated by said weight member for supplying fluid under pressure to said second hydraulic actuating means to cause movement of said swing-house assembly laterally toward one side when that side is inclined upwardly and toward the other side when the other side is inclined upwardly.

References Cited by the Examiner

UNITED STATES PATENTS

| 2,472,726 | 6/49 | Russell | 212—69 |
| 2,572,910 | 10/51 | Brown | 280—6.1 |

FOREIGN PATENTS 606,693  12/34  Germany.

ERNEST A. FALLER, *Primary Examiner.*

ANDRES H. NEILSEN, *Examiner.*